US012586862B2

(12) United States Patent
Han et al.

(10) Patent No.: US 12,586,862 B2
(45) Date of Patent: Mar. 24, 2026

(54) BATTERY PACK

(71) Applicant: SK ON CO., LTD., Seoul (KR)

(72) Inventors: Jin Su Han, Daejeon (KR); Min Song Kang, Daejeon (KR); Ju Yong Park, Daejeon (KR); Sei Hoon Cho, Daejeon (KR); Ji Woong Kim, Daejeon (KR); Byeong Jun Pak, Daejeon (KR)

(73) Assignee: SK ON CO., LTD., Seoul (KR)

( * ) Notice: Subject to any disclaimer, the term of this patent is extended or adjusted under 35 U.S.C. 154(b) by 804 days.

(21) Appl. No.: 17/958,027

(22) Filed: Sep. 30, 2022

(65) Prior Publication Data

US 2023/0101256 A1 Mar. 30, 2023

(30) Foreign Application Priority Data

Sep. 30, 2021 (KR) ........................ 10-2021-0129548

(51) Int. Cl.
*H01M 50/35* (2021.01)
*H01M 50/291* (2021.01)
(52) U.S. Cl.
CPC ......... *H01M 50/35* (2021.01); *H01M 50/291* (2021.01)
(58) Field of Classification Search
None
See application file for complete search history.

(56) References Cited

U.S. PATENT DOCUMENTS

| | | | |
|---|---|---|---|
| 2011/0174556 A1 | 7/2011 | Hermann et al. | |
| 2020/0152935 A1 | 5/2020 | Wynn et al. | |
| 2020/0212396 A1* | 7/2020 | Chen ........................ | A62C 3/16 |
| 2021/0119298 A1 | 4/2021 | Chen et al. | |
| 2021/0280937 A1 | 9/2021 | Rhee et al. | |

FOREIGN PATENT DOCUMENTS

| | | | |
|---|---|---|---|
| CN | 111668408 | * | 9/2020 |
| CN | 110416452 B | | 10/2020 |

OTHER PUBLICATIONS

Machine translation of CN111668408 (Year: 2020).*
Extended European Search Report for European Patent Application No. 22197859.6, mailed Mar. 17, 2023 (8 pages).
Office Action for Korean Patent Application No. 10-2021-0129548, mailed Dec. 8, 2025, 19 pages.

* cited by examiner

*Primary Examiner* — Wyatt P Mcconnell
(74) *Attorney, Agent, or Firm* — Perkins Coie LLP

(57) ABSTRACT

A battery pack includes a lower plate on which one or more cell assemblies are disposed, one or more support frames coupled to the lower plate, and one or more reinforcing members coupled to one side of the support frame to form a venting path. The reinforcing member includes a material different from a material of the support frame.

14 Claims, 8 Drawing Sheets

1000

BATTERY PACK

CROSS-REFERENCE TO RELATED APPLICATION

This patent document claims the priority and benefits of Korean Patent Application No. 10-2021-0129548 filed in the Korean Intellectual Property Office on Sep. 30, 2021, the entire disclosure of which is incorporated herein by reference for all purposes.

TECHNICAL FIELD

The present disclosure relates to a battery pack, and more particularly, to a battery pack in which structural stability may be secured even in an event occurrence situation through a pack housing structure including a reinforcing member.

BACKGROUND

Secondary batteries, unlike primary batteries, have the convenience of being able to be charged and discharged, and are attracting a lot of attention as a power source for various mobile devices and power sources for electric vehicles. For example, a secondary battery using non-aqueous electrolyte if a high energy density has good output and may thus be used to drive a motor of an electric vehicle by connecting a plurality of secondary batteries in series or in parallel.

Battery modules applied to electric vehicles or the like are modularized by electrically connecting a plurality of battery cells due to the need for high output and large capacity, and the electric vehicle is provided with a battery pack in which a plurality of such battery modules are arranged to obtain high power.

In a battery pack of the related art, when any one battery module or cell assembly accommodated therein ignites, flame or thermal energy may be easily transferred to other adjacent battery modules or cell assemblies, and as a result, there is a risk that multiple battery modules may be ignited in series.

In addition, there is a problem in that the flame generated in the battery module or cell assembly is propagated to other components (e.g., the inner and outer frames of the battery pack) of the battery pack, thereby destroying the entire structure of the battery pack.

SUMMARY

The disclosed technology can be implemented in some embodiments to provide a battery pack capable of preventing the structure of the battery pack from collapsing by a flame generated in a cell assembly by applying a reinforcing member having strong resistance to heat or flame.

An aspect of the present disclosure is to provide a battery pack capable of effectively discharging heat or flame generated from battery cells to the outside of the battery pack to prevent a chain ignition or explosion.

According to an aspect of the present disclosure, a battery pack includes a lower plate on which one or more cell assemblies are seated, one or more support frames coupled to the lower plate, and one or more reinforcing members coupled to one side of the support frame to form a venting path. The one or more reinforcing members are formed of a material different from a material of the support frame.

The battery pack may further include at least one coupling member mutually coupling the reinforcing member and the support frame.

The reinforcing member may be formed of a material having a melting point higher than a melting point of the support frame.

The support frame may be formed of the same material as a material of the lower plate, and the reinforcing member may include steel, stainless steel, mica, or a combination of two or more of steel, stainless steel, mica.

The support frame may include a first support frame extending along one edge of the lower plate, and at least one second support frame extending in a direction different from an extending direction of the first support frame, on an upper surface of the lower plate. An end of the second support frame may be adjacent to one side of the first support frame. In some implementations, the extending direction of the first support frame may indicate a direction in which the first support frame extends.

The reinforcing member may include a first reinforcing member having one surface coupled to the first support frame, and a second reinforcing member coupled to the other surface of the first reinforcing member. A first venting path may be disposed in a space between the first reinforcing member and the second reinforcing member. The first reinforcing member and the second reinforcing member are provided with the first venting path disposed in a space therebetween.

The reinforcing member may further include a third reinforcing member respectively coupled to both sides of the second support frame. A second venting path may be formed along the third reinforcing member.

An opening may be provided in a portion of the second reinforcing member adjacent to an end of the second support frame. The second venting path may communicate with the first venting path through the opening.

The cell assembly may be provided between the second support frames adjacent to each other, and a venting hole may be disposed in one surface of the cell assembly facing the third reinforcing member.

The coupling member may penetrate through the first reinforcing member and the second reinforcing member and may be coupled to the first support frame.

The coupling member may be provided as a plurality of coupling members in a longitudinal direction of the first support frame.

According to an aspect of the present disclosure, a battery pack includes a pack housing provided with an accommodating space, and one or more cell assemblies accommodated in the accommodating space. The pack housing includes a lower plate on which the cell assembly is seated, and a first partition wall member extending along at least a partial edge of the lower plate. The first partition wall member includes a first flow path member formed of a material melted at a temperature of 700° C. or higher.

The first flow path member may be provided to face the cell assembly.

The pack housing may further include one or more second partition wall members partitioning the accommodating space. The second partition wall member may include a second flow path member formed of a material melted at a temperature of 700° C. or higher.

The second flow path member may be provided on both sides of the second partition wall member, respectively.

An end of the second partition wall member may be adjacent to one surface of the first flow path member, and an opening may be provided in a portion of the first flow path member adjacent to the end of the second partition wall member.

The above and other aspects and implementations of the disclosed technology are described in greater detail in the drawings, the description and the claims.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
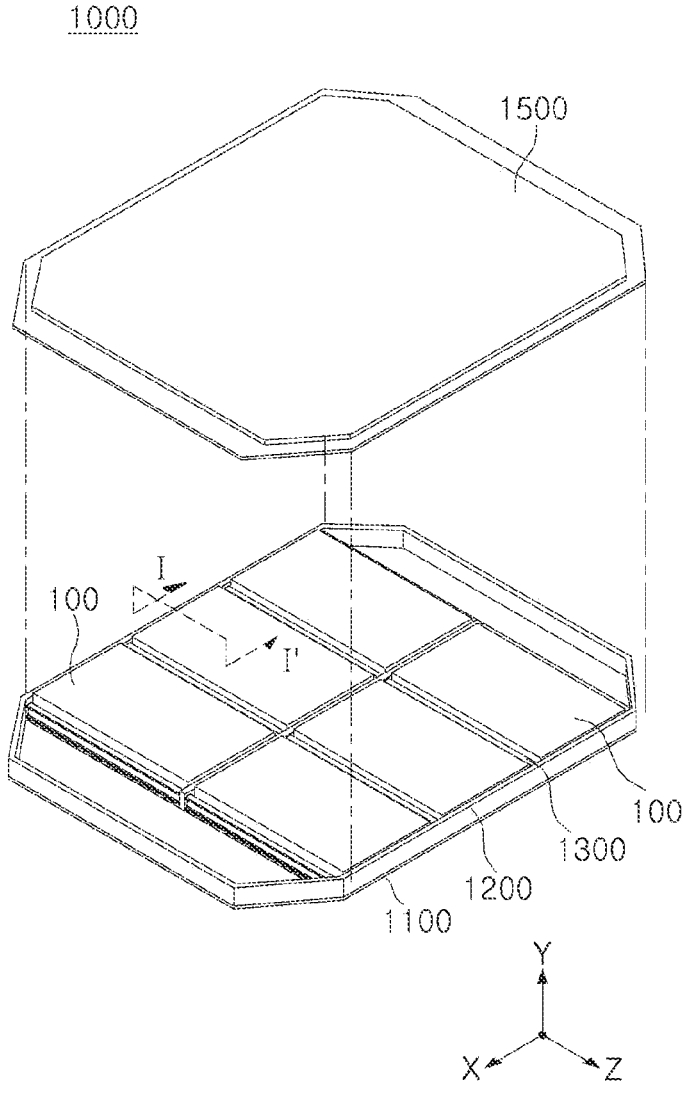
FIG. 1 is a perspective view of a battery pack according to embodiments.

The following detailed description is provided examples for implementing the methods, apparatuses, and/or systems described herein. However, various changes, modifications, and equivalents of the methods, apparatuses, and/or systems described herein will be made based on what is disclosed herein. The sequences of operations described herein are merely examples, and are not limited to those set forth herein, but may be changed as will be apparent to one of ordinary skill in the art, with the exception of operations necessarily occurring in a certain order.

The features described herein may be embodied in different forms, and are not to be construed as being limited to the examples described herein. Rather, the examples described herein have been provided and thus, this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the detailed shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

In addition, terms including an ordinal number, such as "first", "second", and the like used herein may be used to describe various elements, but the elements are not limited by the terms, and the terms are used only for the purpose of distinguishing one component from another. For example, without departing from the scope of the present disclosure, a first component may be referred to as a second component, and similarly, a second component may also be referred to as a first component.

Figure 2:
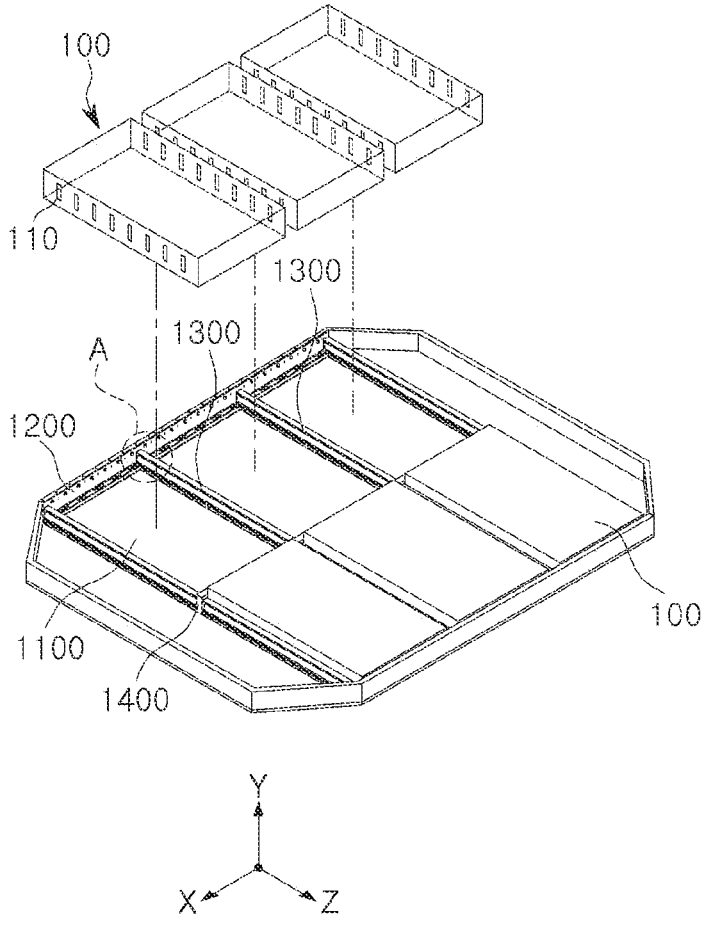
FIG. 2 is an exploded perspective view of a portion of a battery pack according to embodiments.

FIG. 1 is a perspective view of a battery pack 1000 according to embodiments, and FIG. 2 is an exploded perspective view of a portion of the battery pack 1000 according to embodiments.

The battery pack 1000 according to embodiments may include a pack housing and one or more cell assemblies 100 accommodated in an inner space of the pack housing.

The cell assembly 100 may include one or more battery cells (not illustrated) capable of charging and discharging to store or discharge electrical energy. For example, the cell assembly 100 may include one or more battery cells (not illustrated) configured as a secondary battery such as a lithium ion battery or a nickel-hydrogen battery.

In embodiments, the cell assembly 100 may be a battery module including a cell stack (not illustrated) in which one or more battery cells (not illustrated) are stacked, a bus bar assembly (not illustrated) electrically connected to the cell stack (not illustrated), and an outer case. The cell assembly 100 may be provided in the shape of a hexahedron, as illustrated in FIG. 2. However, the external shape of the cell assembly 100 is not limited thereto, and may be provided in various shapes.

Various components other than the one or more cell assemblies 100 may be accommodated in the internal space of the battery pack 1000. For example, a connection member (not illustrated) connecting the plurality of cell assemblies 100 to each other may be accommodated in the inner space of the battery pack 1000, or a sensing member (not illustrated) capable of sensing the temperature or input/output voltage of the battery pack 1000 may be accommodated.

The pack housing of the battery pack 1000 according to embodiments may include a lower plate 1100 on which the cell assembly 100 is seated, a plurality of partition wall members 1200, 1300 and 1400 coupled to the lower plate 1100 and partitioning an internal space, and an upper plate 1500 covering the inner space.

The lower plate 1100 forms the lower surface of the pack housing. The lower plate 1100 may be formed of a plate-shaped member having a seating surface on which the plurality of cell assemblies 100 are mounted. For example, the lower plate 1100 may be provided as a quadrangular plate-shaped member, or as a polygonal plate-shaped member as illustrated in FIG. 1. However, a detailed shape of the lower plate 1100 is not limited to the above-described shape.

The lower plate 1100 may be formed of a metal material having a certain rigidity or higher. For example, at least a portion of the lower plate 1100 may include aluminum. When the lower plate 1100 includes aluminum, it may be expected that heat energy generated in the cell assembly 100 is rapidly radiated to the outside of the battery pack 1000 due to the excellent thermal conductivity of aluminum. In embodiments, to increase the heat dissipation effect, the lower plate 1100 may further include a heat dissipation member (not illustrated) or a cooling member (not illustrated). For example, the heat dissipation member (not illustrated) may be provided between the cell assembly 100 and the lower plate 1100 to rapidly transfer thermal energy generated in the cell assembly 100 in the direction of the lower plate 1100.

One or more partition wall members 1200, 1300, and 1400 may be coupled to the lower plate 1100. The partition members 1200, 1300, and 1400 may partition an inner space of the pack housing to form accommodation spaces in which the plurality of cell assemblies 100 are accommodated. The partition members 1200, 1300, and 1400 may be formed of a metal material having rigidity greater than or equal to a certain level. For example, at least a portion of the partition members 1200, 1300, and 1400 may be formed of aluminum for a relatively high heat dissipation effect.

In embodiments, the partition members 1200, 1300, and 1400 may be provided in plural, and may extend respectively in different directions to partition the inner space of the pack housing. For example, as illustrated in FIG. 2, the partition member may include a first partition wall member 1200 extending in a first direction (e.g., X-axis direction) to form a side portion of the pack housing, and a plurality of second partition wall members 1300 defining an inner space while traversing the upper surface of the lower plate 1100 in the second direction (e.g., the Z-axis direction).

In embodiments, the first partition wall member 1200 may be provided to extend along one edge of the lower plate 1100. The first partition wall member 1200 may be a side partition member forming a side portion of the battery pack 1000.

In embodiments, the second partition wall members 1300 may be coupled to the upper surface of the lower plate 1100 and extend in a direction different from the first partition wall member 1200. For example, the second partition wall member 1300 may extend in a direction perpendicular to the first partition wall member 1200. The second partition wall member 1300 may be an internal partition wall member that partitions an internal space of the battery pack 1000. One or more cell assemblies 100 may be accommodated in each accommodating space partitioned by the second partition wall member 1300. For example, as illustrated in FIG. 2, the cell assembly 100 may be accommodated between the second partition wall members 1300 adjacent to each other.

The second partition wall member 1300 may be provided such that one end thereof is adjacent to the first partition wall member 1200. For example, as illustrated in FIG. 2, a plurality of second partition wall members 1300 may be provided side by side along the first partition wall member 1200, and an end of each second partition wall member 1300 may be disposed adjacent to the first partition wall member 1200.

In embodiments, a third partition wall member 1400 may be further provided to extend in a direction different from that of the second partition wall member 1300 to partition an internal space of the battery pack 1000. For example, as illustrated in FIG. 2, the third partition member 1400 may be a partition member extending in a direction (e.g., in the X-axis direction) perpendicular to the second partition wall member 1300 to partition an inner space of the battery pack 1000. For example, the inner space of the battery pack 1000 may be partitioned in a grid shape by the second partition wall member 1300 and the third partition wall member 1400, and the one or more cell assemblies 100 may respectively be disposed in the accommodating space partitioned in the grid shape.

In embodiments, the first to third partition wall members 1200, 1300, and 1400 may be provided separately or may be provided integrally.

As the battery cells included in the cell assembly 100 are charged and discharged under severe conditions, a flame or high-temperature gas may be generated from the battery cells. To smoothly discharge the flame or gas to the outside of the cell assembly 100, the cell assembly 100 according to embodiments may include one or more venting holes 110. Through a venting hole 110, thermal energy or gas generated in the battery cell may be discharged to the outside of the cell assembly 100 in a predetermined direction.

The flame or high-temperature gas discharged from the cell assembly 100 comes into contact with some partition members around the cell assembly 100, and thus, high thermal energy may be applied to some partition wall members. Also, when a flame or high-temperature gas generated in one cell assembly 100 stays inside the battery pack 1000 for a long time, a chain ignition of other adjacent cell assemblies 100 may be caused. Therefore, it is necessary to protect the partition members 1200, 1300, and 1400 from the flame or high-temperature gas discharged from the cell assembly 100, and at the same time, to rapidly discharge the flame or high-temperature gas to the outside of the battery pack 1000.

To this end, the partition members 1200, 1300, and 1400 according to embodiments may be provided with a reinforcing member having the shape or structure that does not collapse even at a high temperature. For example, the reinforcing member may be provided in a position facing the cell assembly 100 in the partition members 1200, 1300 and 1400, and may protect the partition members 1200, 1300 and 1400 from a flame or high-temperature gas emitted through the venting hole 110. In addition, the reinforcing member may extend in one direction to form a venting path, thereby guiding the flow of a flame or a high-temperature gas. Accordingly, the flame or gas discharged from the cell assembly 100 may flow along the venting path formed by the reinforcing member and be rapidly discharged to the outside of the battery pack 1000.

Hereinafter, a partition member provided with a reinforcing member according to embodiments will be described in detail with reference to FIGS. 3 to 5.

Figure 3:
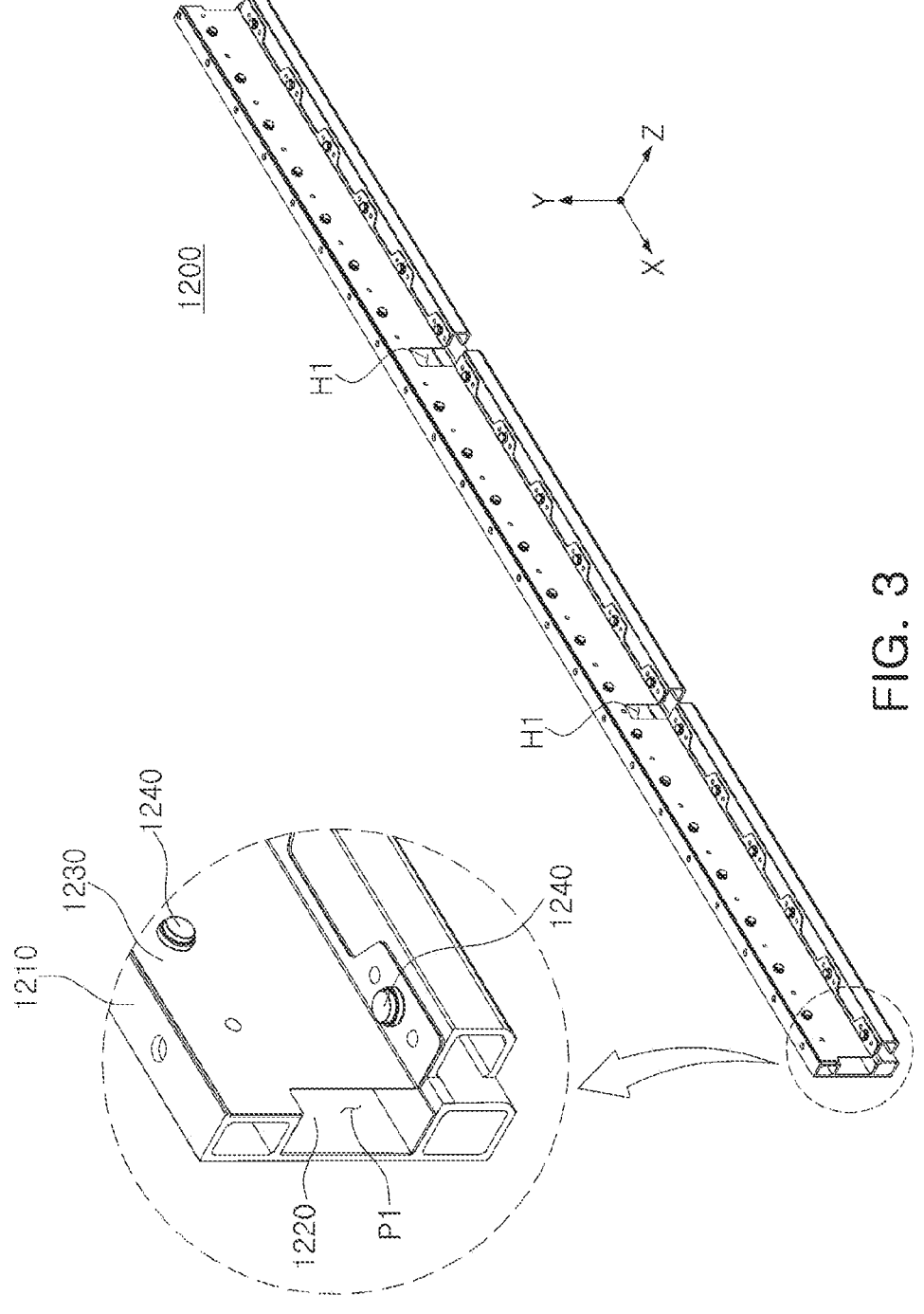
FIG. 3 is a perspective view of a first partition wall member according to embodiments.
Figure 4:
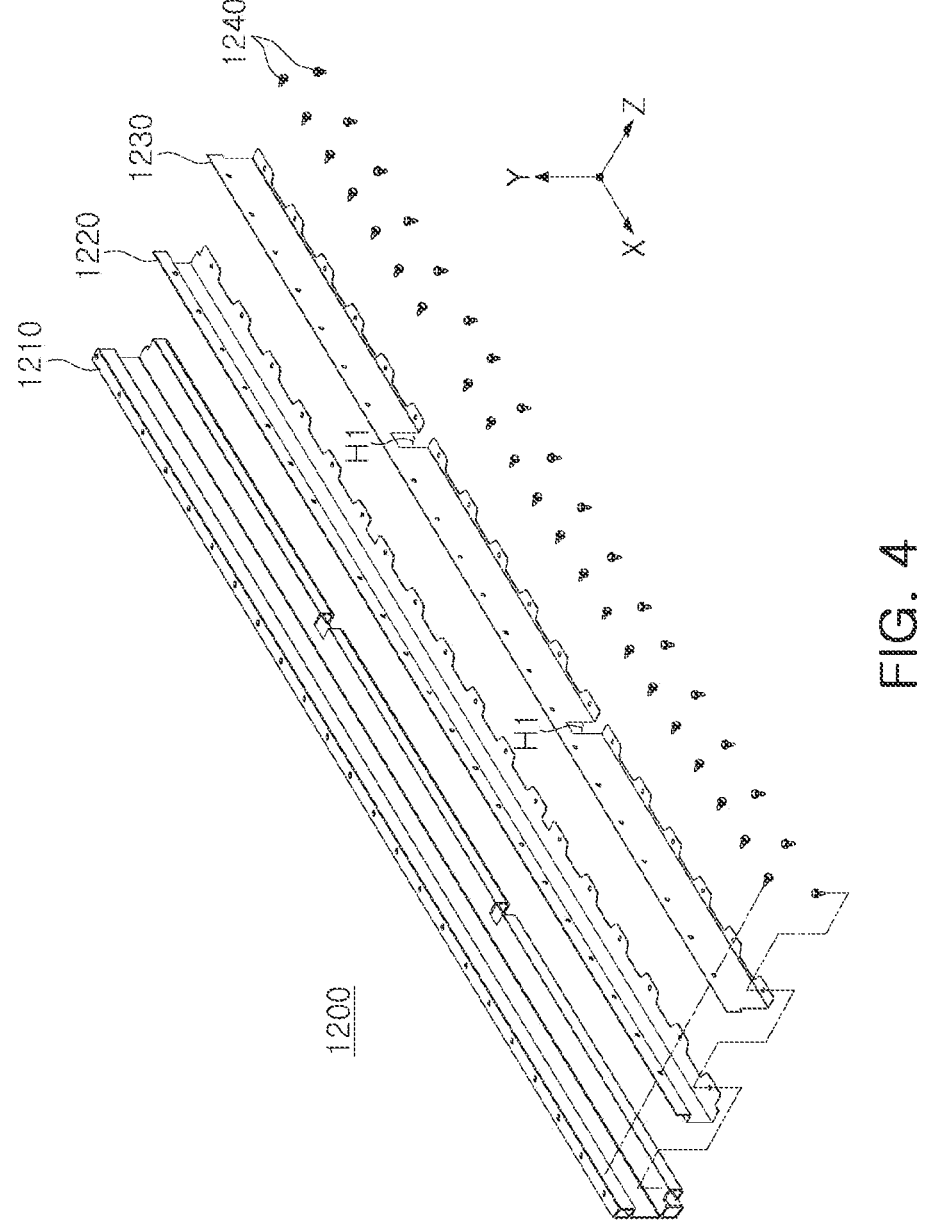
FIG. 4 is an exploded perspective view of a first partition wall member according to embodiments.

FIG. 3 is a perspective view of the first partition wall member 1200 according to embodiments. FIG. 4 is an exploded perspective view of the first partition wall member 1200 according to embodiments. Since the first partition wall member 1200 described in FIGS. 3 and 4 may correspond to the first partition wall member 1200 described in FIGS. 1 and 2 above, the description overlapping with those of FIGS. 1 and 2 will be omitted.

The first partition wall member 1200 according to embodiments may include a first support frame 1210 and one or more reinforcing members 1220 and 1230 coupled to the first support frame 1210.

The first support frame 1210 may be coupled to the lower plate 1100 of FIGS. 1 and 2 to form a sidewall of the battery pack (1000 of FIGS. 1 and 2). The first support frame 1210 may be formed of a material having rigidity, to support the load applied in the height direction (e.g., the Y-axis direction) of the battery pack (1000 in FIGS. 1 and 2) and in various other directions.

The first support frame 1210 may be provided in the shape of a beam extending in one direction (e.g., the X-axis direction). For example, the first support frame 1210 may be provided to extend along an edge of a portion of the lower plate 1100 of FIGS. 1 and 2.

The first support frame 1210 may be coupled to the lower plate 1100 (refer to FIGS. 1 and 2) in various manners. For example, the first support frame 1210 may be welded to and coupled to the lower plate 1100 in FIGS. 1 and 2. In this case, to secure sufficient welding coupling force, the first support frame 1210 may be formed of the same material as the lower plate (1100 in FIGS. 1 and 2). However, the material of the first support frame 1210 is not limited thereto, and may be formed of a material different from that of the lower plate 1100 of FIGS. 1 and 2.

In embodiments, the first partition wall member 1200 may include one or more reinforcing members 1220 and 1230 capable of increasing the structural stability of the first support frame 1210. For example, to protect the first support frame 1210 from flames or high-temperature gas emitted from the cell assembly (100 in FIGS. 1 and 2), the first partition wall member 1200 may include a first reinforcing member 1220 coupled to one side of the first support frame 1210 and a second reinforcing member 1230 coupled to the first reinforcing member 1220.

A first venting path P1 that is an empty space may be formed between the first reinforcing member 1220 and the second reinforcing member 1230, and high-temperature gas emitted from the cell assembly (100 in FIGS. 1 and 2) may flow in the longitudinal direction (e.g., X-axis direction) of the first partition wall member 1200 through the first venting path P1. For example, the first reinforcing member 1220 and the second reinforcing member 1230 may function as a flow path member for guiding the movement of a flame or a high-temperature gas.

In embodiments, the first venting path P1 may be formed to extend in the longitudinal direction of the first partition wall member 1200, and accordingly, a flame or high temperature gas generated in the cell assembly (100 in FIGS. 1 and 2) may move toward both ends of the first partition wall member 1200 along the first venting path P1. The flame or gas moving to both ends of the first partition wall member 1200 may be discharged to the outside of the battery pack (1000 in FIGS. 1 and 2) through an outlet (not illustrated) provided in the pack housing.

The first reinforcing member 1220 and the second reinforcing member 1230 that protect the first support frame 1210 and form the first venting path P1 may be required to be formed of a material and a structure that may withstand high-temperature thermal energy. To this end, the first reinforcing member 1220 and the second reinforcing member 1230 according to embodiments may be formed of a material having a higher melting point than that of the first support frame 1210. For example, when the first support frame 1210 is formed of aluminum, the first reinforcing member 1220 and the second reinforcing member 1230 may be formed of a material having a melting point higher than the melting point (about 660 degrees Celsius) of aluminum.

In embodiments, the first reinforcing member 1220 and the second reinforcing member 1230 may be formed by including a high heat resistance and high fire resistance material that is melted at a temperature of 700° C. or higher. Examples of the high heat resistance material included in the first reinforcing member 1220 and the second reinforcing member 1230 include, but are not limited to, an inorganic material such as steel, stainless steel, mica or the like, and any material that does not melt at a temperature of less than 700° C. may be included.

In a case in which the reinforcing members 1220 and 1230 are formed of a material different from that of the support frame 1210, there is a fear that sufficient welding force may not be ensured. Accordingly, the first partition wall member 1200 according to embodiments may further include a coupling member 1240 for more firmly coupling the first support frame 1210 and the reinforcing members 1220 and 1230 to each other. For example, the coupling member 1240 may be provided as screws or bolts and nuts, and may pass through and fasten the first support frame 1210 and the first and second reinforcing members 1220 and 1230 to each other. The first support frame 1210 and the first and second reinforcing members 1220 and 1230 are physically coupled to each other through the coupling member 1240, such that the coupled state may be stably maintained even when high-temperature thermal energy or explosive energy is applied.

The coupling member 1240 according to embodiments may be provided as a plurality of coupling members. For example, as illustrated in FIG. 4, the plurality of coupling members 1240 may be provided in the longitudinal direction (X-axis direction) of the first partition wall member 1200. In addition, the plurality of coupling members 1240 may be coupled to the support frame 1210 by pressing the reinforcing members 1220 and 1230 in different directions. For example, as illustrated in FIG. 3, a portion of the coupling members 1240 may connect the reinforcement members 1220 and 1230 and the support frame 1210 in the width direction (e.g., in the Z-axis direction) of the battery pack (e.g., 1000 in FIGS. 1 and 2), the remaining part may be provided to couple the reinforcement member and the support frame in the height direction (e.g., the Y-axis direction) of the battery pack (1000 in FIGS. 1 and 2).

In some embodiments, an opening H1 may be provided in a portion of the first partition wall member 1200 adjacent to an end of the second partition wall member 1300. For example, as illustrated in FIG. 3 or FIG. 4, a hole that is the opening H1 may be provided in a partial surface of the second reinforcing member 1230. The second partition wall member 1300 may be provided on the upper surface of the lower plate (1100 in FIGS. 1 and 2) such that an end thereof is adjacent to the opening H1, and thus, flame or gas flowing along the second partition wall member 1300 may be introduced into the first venting path P1 through the opening H1.

Hereinafter, the second partition wall member 1300 will be described in detail with reference to FIG. 5.

Figure 5:
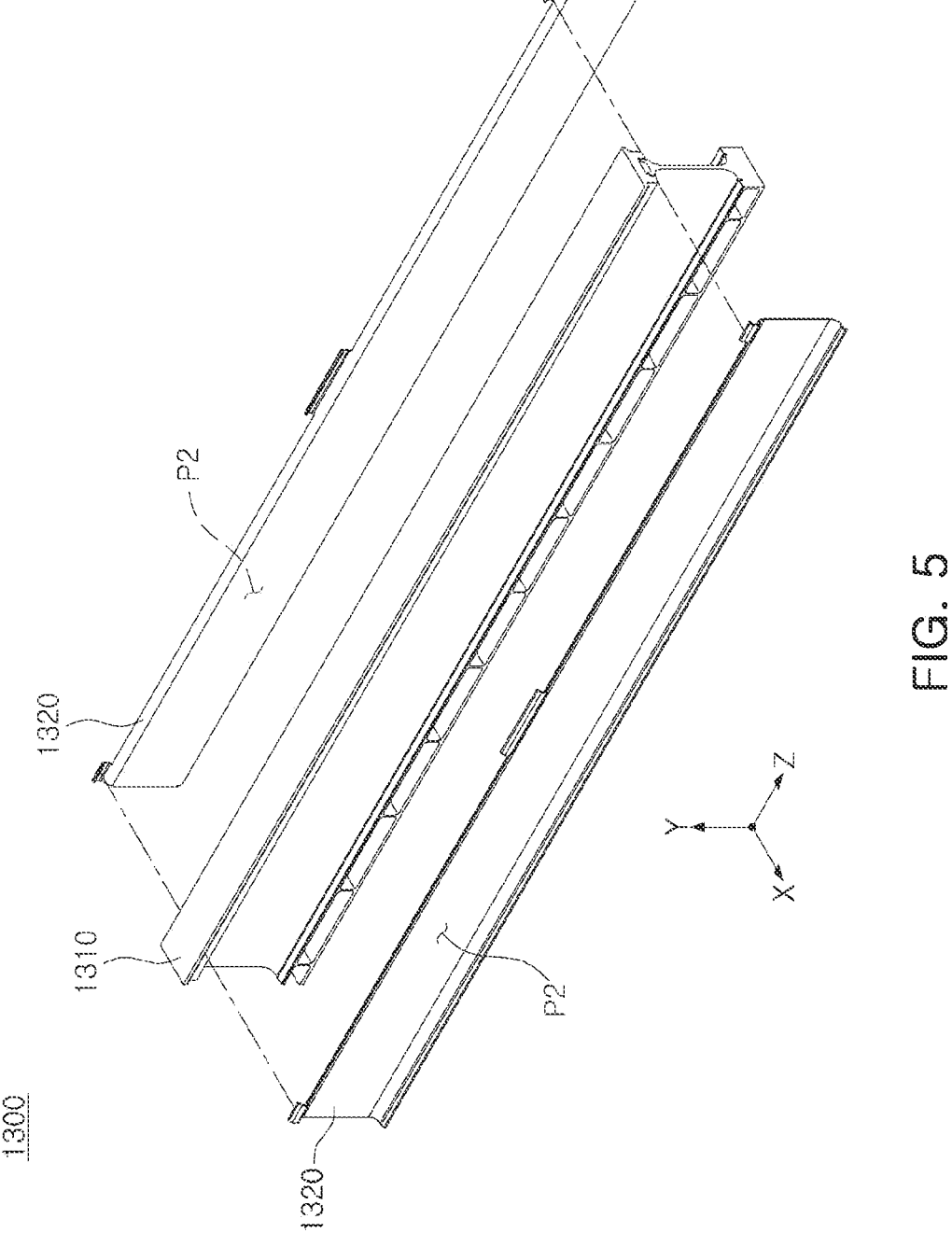
FIG. 5 is an exploded perspective view of a second partition wall member according to embodiments.

FIG. 5 is an exploded perspective view of the second partition wall member 1300 according to embodiments. Since the second partition wall member 1300 described in FIG. 5 corresponds to the second partition wall member 1300 described in FIGS. 1 to 4, the overlapping description thereof will be omitted.

The second partition wall member 1300 according to embodiments may include a second support frame 1310 and one or more reinforcing members 1320 coupled to the second support frame 1310.

The second support frame 1310 may be provided in the shape of a beam extending in one direction (e.g., the Z-axis direction of FIG. 5). For example, the second support frame 1310 may be provided as an 'I'-shaped beam in which the upper and lower portions of the cross-section are wider than the middle portion.

In embodiments, the second support frame 1310 may be provided to extend by traversing the upper surface of the lower plate 1100 of FIGS. 1 and 2. The second support frame 1310 may be provided as one or more second support frames 1310 on the upper surface of the lower plate 1100 in FIGS. 1 and 2. For example, as illustrated in FIG. 2, a plurality of second support frames 1310 may be disposed parallel to the upper surface of the lower plate (1100 in FIGS. 1 and 2) to partition the internal space of the battery pack (1000 in FIGS. 1 and 2).

The second support frame 1310 may be coupled to the lower plate 1100 of FIGS. 1 and 2 in various manners. For example, the second support frame 1310 may be welded to and coupled to the lower plate 1100 (refer to FIGS. 1 and 2). In this case, to secure sufficient welding coupling force, the second support frame 1310 may be formed of the same material as the lower plate (1100 in FIGS. 1 and 2). However, the material of the second support frame 1310 is not limited thereto, and may be formed of a material different from that of the lower plate 1100 of FIGS. 1 and 2.

In embodiments, the second partition wall member 1300 may include one or more reinforcing members 1320 capable of increasing structural stability of the second support frame 1310. For example, to protect the second support frame 1310 from flames or high-temperature gas emitted from the cell assembly (100 in FIGS. 1 and 2), the second partition wall member 1300 may include a third reinforcing member 1320 coupled to one or both sides of the second support frame 1310.

In embodiments, the third reinforcing member 1320 may be provided in such a manner that one surface faces the cell assembly (100 in FIGS. 1 and 2) and the other surface faces the second support frame 1310. Accordingly, the flame or high-temperature gas emitted from the cell assembly (100 in FIGS. 1 and 2) flows along one surface of the third reinforcing member 1320 to protect the second support frame 1310 located on the other surface of the third reinforcing member 1320.

A second venting path P2 may be formed in a space between the third reinforcing member 1320 and the cell assembly 100 (refer to FIGS. 1 and 2). The high-temperature gas emitted from the cell assembly (100 in FIGS. 1 and 2) may flow in the longitudinal direction (e.g., Z-axis direction) of the second partition wall member 1300 through the second venting path P2. For example, the third reinforcing member 1320 may function as a flow path member for guiding a movement path of a flame or a high-temperature gas.

In embodiments, the third reinforcing member 1320 may be provided on both sides of the second support frame 1310, respectively. Accordingly, the second support frame 1310 may be protected from flames emitted from the cell assemblies (100 in FIGS. 1 and 2) disposed on both side surfaces of the second partition wall member 1300. In this case, the second venting path P2 may be formed between each third protection member and the cell assembly (100 in FIGS. 1 and 2).

Like the first and second reinforcing members 1220 and 1230, the third reinforcing member 1320 forming the second venting path P2 needs to be formed of a material and structure that may withstand high-temperature thermal energy. To this end, the third reinforcing member 1320 according to embodiments may be formed of a material having a higher melting point than that of the second support frame 1310. For example, when the second support frame 1310 is formed of aluminum, the third reinforcing member 1320 may be formed of a material having a melting point higher than the melting point (about 660 degrees Celsius) of aluminum.

In embodiments, the third reinforcing member 1320 may include a high heat resistance and high fire resistance material that is melted at a temperature of 700° C. or higher. Examples of the high heat resistance material included in the third reinforcing member 1320 include, but are not limited to, inorganic materials such as steel, stainless steel, and mica, and any material that is not melted at a temperature of less than 700° C. may be included.

The second partition wall member 1300 according to embodiments may be manufactured by an insert injection method. For example, after disposing the third reinforcing member 1320 in the mold, the second support frame 1310 is formed by a die casting method to integrally manufacture the third reinforcing member 1320 and the second support frame 1310. However, the manufacturing method of the second partition wall member 1300 is not limited to the above-described method. For example, the second support frame 1310 and the third reinforcing member 1320 may be physically coupled through one or more coupling members or adhesive members to form the second partition wall member 1300.

Flame or gas moving through the second venting path P2 formed in the second partition wall member 1300 may flow into the first venting path P1 through the opening H1 of the first partition wall member 1200. Hereinafter, a reinforcing member and a venting path formed by the reinforcing member according to embodiments will be described in detail with reference to FIGS. 6 to 8.

Figure 6:
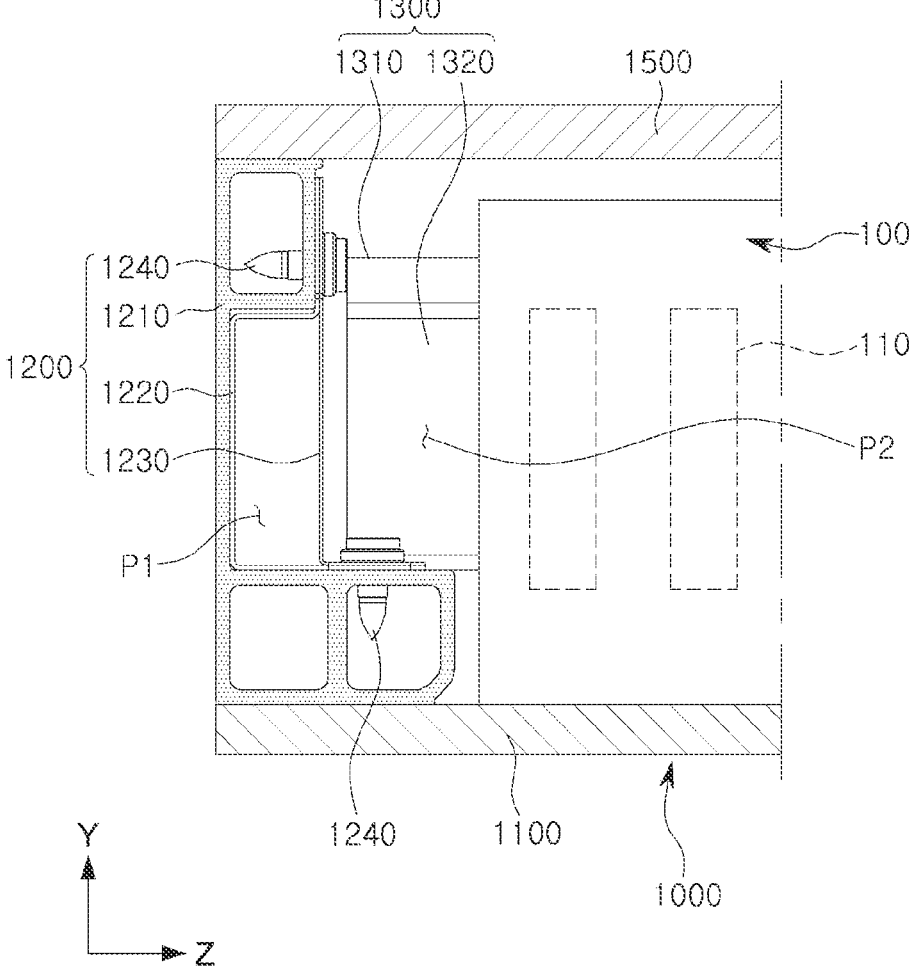
FIGS. 6 and 7 are cross-sectional views taken along line I-I' of FIG. 1.
Figure 7:
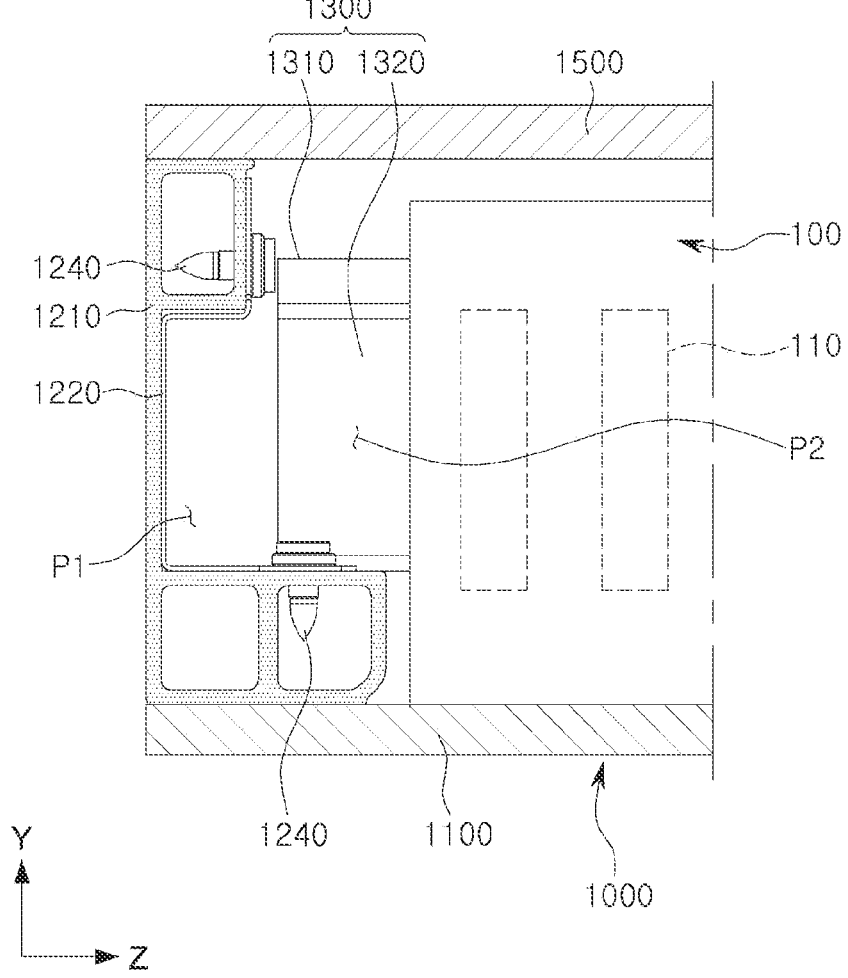
Figure 8:
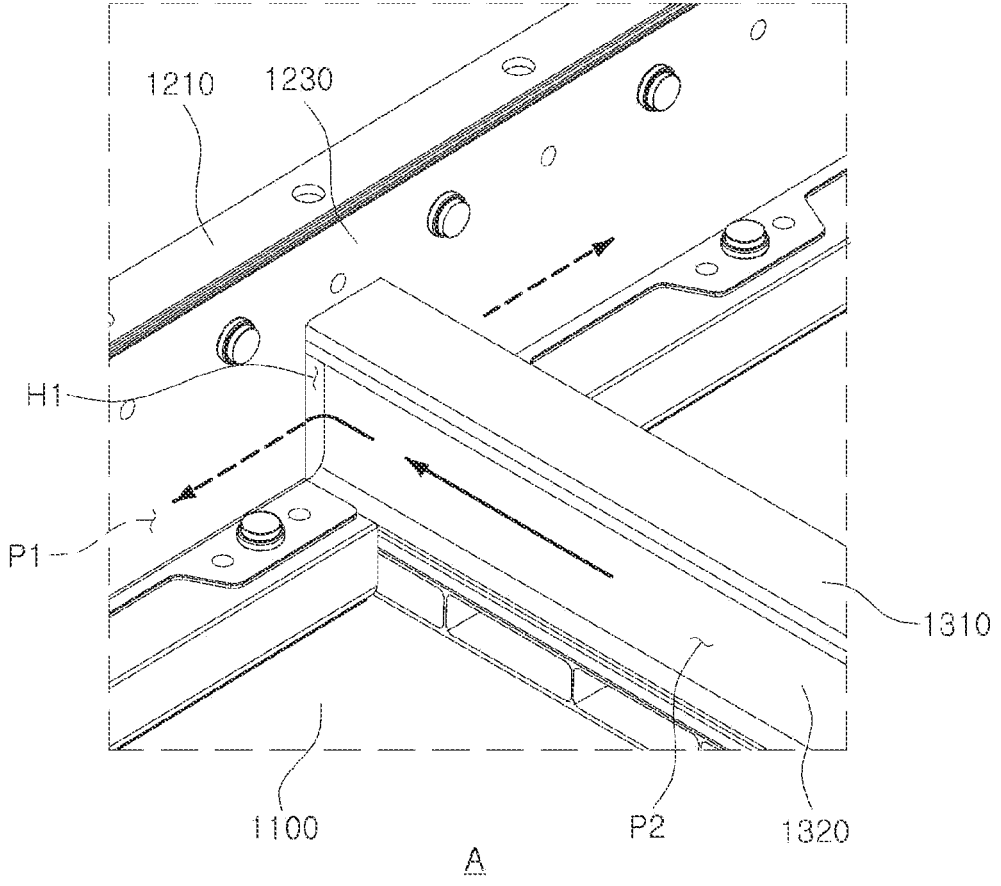
FIG. 8 is an enlarged view of part A of FIG. 2.

FIGS. 6 and 7 are cross-sectional views taken along line I-I' of FIG. 1. FIG. 8 is an enlarged view of part A of FIG. 2. Since the battery pack 1000 and components thereof (for example, the first partition wall member 1200, the second partition wall member 1300, and the like) described in FIGS. 6 to 8 correspond to the battery pack 1000 and the components thereof (e.g., the first partition wall member 1200, the second partition wall member 1300 and the like) to each other, overlapping descriptions will be omitted.

The battery pack 1000 according to embodiments may include a lower plate 1100, one or more cell assemblies 100 seated on the lower plate 1100, a first partition wall member 1200 and a second partition wall member 1300 coupled to the lower plate 1100 and partitioning an internal space, and an upper plate 1500 covering an upper portion of the inner space.

Flame or high-temperature gas generated inside the cell assembly 100 may be discharged into the inner space of the battery pack 1000 through the venting hole 110 provided in the side of the cell assembly 100, and accordingly, the flame or gas is in direct contact with the partition members 1200 and 1300 partitioning the inner space to apply high-temperature thermal energy. To protect the partition members 1200 and 1300 from flame or gas, the partition members 1200 and 1300 provided in the battery pack 1000 according to embodiments may include one or more reinforcing members 1220, 1230 and 1320. For example, as illustrated in FIG. 6, a first reinforcing member 1220 and a second reinforcing member 1230 may be provided in the first partition wall member 1200 adjacent to the cell assembly 100, and a third reinforcing member 1320 may be provided in the second partition wall member 1300.

To effectively protect the partition members 1200 and 1300, the reinforcing members 1220, 1230, and 1320 according to embodiments may be provided in positions corresponding to the venting holes 110 of the cell assembly 100. For example, as illustrated in FIG. 6, the first to third reinforcing members 1220, 1230 and 1320 may be provided to face the cell assembly 100 at the same height as or similar to the venting hole 110 of the cell assembly 100, with respect to the lower plate 1100. Accordingly, since flame or gas emitted from the venting hole 110 intensively comes into contact with the reinforcing members 1220, 1230 and 1320, direct exposure of the support frames 1210 and 1310 to high-temperature thermal shock may be significantly reduced.

The reinforcing members 1220, 1230 and 1320 provided in the partition members 1200 and 1300 may protect the support frames 1210 and 1310, and at the same time, may form venting paths P1 and P2 through which the gas or flame emitted from the cell assembly 100 moves. For example, a first venting path P1 may be formed in a space between the first reinforcing member 1220 and the second reinforcing member 1230 provided in the first partition wall member 1200, and a second venting path P2 may be formed in a space between the third reinforcing member 1320 provided in the second partition wall member 1300 and the cell assembly 100. Accordingly, the high-temperature gas discharged from the cell assembly 100 may be smoothly discharged to the outside of the battery pack 1000 through the second venting path P2 and the first venting path P1. For example, the reinforcing members 1220, 1230, and 1320 according to embodiments may function as flow path members inside the battery pack 1000. In detail, the first reinforcing member 1220 and the second reinforcing member 1230 may be coupled to each other to form a first flow path member, and the third reinforcing member 1320 may form a second flow path member.

In another embodiment, the first flow path member may be provided in an open shape toward the cell assembly 100.

For example, as illustrated in FIG. 7, the battery pack 1000 may be provided while the second reinforcing member (1230 of FIG. 6) is omitted. In this case, the first reinforcing member 1220 may form the first flow path member. Accordingly, the first venting path P1 having an open shape toward the cell assembly 100 may be formed. As the second reinforcing member (1230 of FIG. 6) is omitted, the total weight of the battery pack 1000 may be reduced. On the other hand, since the battery pack 1000 described in FIG. 7 is the same as the battery pack 1000 of FIG. 6 except that the second reinforcing member (1230 of FIG. 6) is omitted, the description overlapping with that of FIG. 6 will be omitted.

Referring to FIGS. 6 and 8, the high-temperature gas discharged from the venting hole 110 of the cell assembly 100 may move along the second venting path P2 that is formed along the third reinforcing member 1320. The end of the third reinforcing member 1320 may be provided adjacent to an opening H1 of the first partition wall member 1200, and accordingly, the flame or gas moving through the second venting path P2 may flow into the first venting path P1 of the first partition wall member 1200. For example, as illustrated in FIG. 8, the second venting path P2 formed in one surface of the second partition wall member 1300 and the first venting path P1 formed in the first partition wall member 1200 may communicate with each other through the opening H1. Accordingly, as illustrated by the thick arrow in FIG. 8, the flame or gas flowing along the second venting path P2 may enter the first venting path P1 through the opening H1, and then, may move in the longitudinal direction of the first partition wall member 1200 along the first venting path P1. The flame or gas that has moved to both ends of the first partition wall member 1200 may be discharged to the outside of the battery pack 1000 through an outlet (not illustrated) provided in the pack housing.

The battery pack 1000 according to embodiments includes the reinforcing members 1220, 1230, and 1320 protecting the support frames 1210 and 1310, and thus, direct contact of a flame or high-temperature gas generated in the cell assembly 100 with the support frames 1210 and 1310 may be significantly reduced. Accordingly, the structure of the battery pack may be prevented from collapsing due to flame or gas.

In addition, the support frames 1210 and 1310 constituting the skeleton of the battery pack 1000 are manufactured using lightweight aluminum while having relatively high thermal conductivity, or the like. Further, as the high fire resistance reinforcing members 1220, 1230 and 1320 are applied to some regions of the support frames 1210 and 1310, the structure of the battery pack 1000 which is light and has excellent thermal stability may be secured.

In addition, the battery pack 1000 according to embodiments includes the reinforcing members 1220, 1230, and 1320 in the longitudinal direction of the support frames 1210 and 1310, thereby forming venting paths P1 and P2 through which a flow path of a flame or gas may be guided. Accordingly, a flame or high-temperature gas inside the battery pack 1000 may be rapidly discharged externally, and a chain ignition and thermal runaway between the cell assemblies 100 may be prevented in advance.

As set forth above, the battery pack according to embodiments includes a reinforcing member protecting a support frame from flames or high-temperature gas, thereby preventing the structure of the battery pack from collapsing even in a fire situation.

In addition, the battery pack according to embodiments may include a reinforcement member formed of a material different from that of the support frame, thereby reducing the overall weight of the battery pack and securing structural stability.

In addition, the battery pack according to embodiments may rapidly discharge flames or high-temperature gas generated in the battery cells to the outside of the battery pack through a venting path formed by the reinforcing member.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery pack comprising:
a lower plate on which one or more cell assemblies are disposed;
one or more support frames coupled to the lower plate, and the one or more support frames include a first support frame extending along at least one edge of the lower plate; and
one or more reinforcing members including a material different from a material of the one or more support frames,
wherein the one or more reinforcing members include a first reinforcing member having a first surface coupled to the first support frame and a second reinforcing member coupled to a second surface of the first reinforcing member opposite to the first surface of the first reinforcing member,
wherein the first reinforcing member and the second reinforcing member form a first venting path in a space between the second surface of the first reinforcing member and the second reinforcing member,
wherein the first venting path is surrounded by the second surface of the first reinforcing member and the second reinforcing member.

2. The battery pack of claim 1, further comprising at least one coupling member mutually coupling the first reinforcing member and the second reinforcing member to the first support frame.

3. The battery pack of claim 1, wherein at least one of the first reinforcing member and the second reinforcing member includes a material having a melting point higher than a melting point of the first support frame.

4. The battery pack of claim 1, wherein the first support frame is formed of the same material as a material of the lower plate, and
at least one of the first reinforcing member and the second reinforcing member includes steel, stainless steel, mica, or a combination of two or more of steel, stainless steel, and mica.

5. The battery pack of claim 1, wherein the one or more support frames further include,
at least one second support frame extending in a direction different from an extending direction of the first support frame, on an upper surface of the lower plate,
wherein an end of the at least one second support frame is adjacent to one side of the first support frame.

6. The battery pack of claim 5, wherein the one or more reinforcing members further include a third reinforcing member coupled to both lateral sides of the at least one second support frame,
wherein the third reinforcing member forms a second venting path along the third reinforcing member.

7. The battery pack of claim 6, further comprising an opening at a portion of the second reinforcing member adjacent to an end of the at least one second support frame,
wherein the second venting path communicates with the first venting path through the opening.

8. The battery pack of claim 6, wherein at least one of the one or more cell assemblies is disposed between second support frames adjacent to each other and includes a venting hole on one surface of the at least one of the one or more cell assemblies facing the third reinforcing member.

9. The battery pack of claim 1, further comprising at least one coupling member mutually coupling the at least one of the first reinforcing member and the second reinforcing member to the first support frame,
wherein the at least one coupling member penetrates through the first reinforcing member and the second reinforcing member and is coupled to the first support frame.

10. The battery pack of claim 9, wherein the at least one coupling member includes a plurality of coupling members arranged along a longitudinal direction of the first support frame.

11. A battery pack comprising:
a pack housing including an accommodating space; and
one or more cell assemblies disposed in the accommodating space,
wherein the pack housing includes,
a lower plate on which the one or more cell assemblies are disposed; and
a first partition wall member extending along at least a partial edge of the lower plate,
wherein the first partition wall member includes a first flow path member including a material that is melted at a temperature of 700° C. or higher,
wherein the first flow path member is connected to the one or more cell assemblies.

12. The battery pack of claim 11, wherein the pack housing further includes one or more second partition wall members partitioning the accommodating space,
wherein the one or more second partition wall members include a second flow path member including a material that is melted at a temperature of 700° C. or higher.

13. The battery pack of claim 12, wherein the second flow path member is disposed on each of both lateral sides of the one or more second partition wall members.

14. The battery pack of claim 12, wherein ends of the one or more second partition wall members are adjacent to one surface of the first flow path member, and
the battery pack further comprises an opening at a portion of the first flow path member adjacent to the ends of the one or more second partition wall members.

* * * * *